United States Patent [19]
Kashiwase et al.

[11] Patent Number: 5,632,354
[45] Date of Patent: May 27, 1997

[54] MOTOR VEHICLE WITH A CONTINUOUSLY VARIABLE TRANSMISSION

[75] Inventors: Hajime Kashiwase; Satoru Watanabe, both of Tokyo, Japan

[73] Assignee: Fuji Jukogyo Kabushiki Kaisha, Tokyo, Japan

[21] Appl. No.: 297,098

[22] Filed: Aug. 26, 1994

[30] Foreign Application Priority Data

Sep. 16, 1993 [JP] Japan ..................... 5-229930
Dec. 27, 1993 [JP] Japan ..................... 5-332183

[51] Int. Cl.$^6$ ............................................. B60K 17/04
[52] U.S. Cl. ............................ 180/344; 180/366; 180/374
[58] Field of Search .................................. 180/337, 344, 180/343, 364, 366, 292, 374; 474/148, 69, 70, 83

[56] References Cited

U.S. PATENT DOCUMENTS 2,805,743  9/1957  Keese ........................ 180/344

FOREIGN PATENT DOCUMENTS 0100534  9/1978  Japan ........................ 180/337

Primary Examiner—Anne Marie Boehler
Attorney, Agent, or Firm—Beveridge, DeGrandi, Weilacher & Young, L.L.P.

[57] ABSTRACT

A transmission and a continuously variable transmission are coaxially arranged to an engine. A front differential is perpendicularly suspended under the forward/reverse changeover apparatus. An axis of the differential crosses at a right angle of an axis of the speed reduction apparatus in an integral structure. The engine is longitudinally housed in a front portion of a toe board in an engine compartment of the motor vehicle. Thus, a compact structure is provided and the engine and the transmission can be arranged in an engine compartment without modifying a vehicle body structure. Further, a transfer apparatus is provided behind the speed reduction apparatus in an integral structure. A most portion of the continuously variable transmission is mounted at a front portion of a toe board in an engine compartment, and power is transmitted from the front differential to front wheels and from the transfer apparatus to rear wheels, thereby providing a power unit of two wheel drive and/or four wheel drive type engine in a compact structure.

4 Claims, 12 Drawing Sheets

MOTOR VEHICLE WITH A CONTINUOUSLY VARIABLE TRANSMISSION

BACKGROUND OF THE INVENTION

This invention relates to a motor vehicle with an engine mounted on a front side thereof to drive front wheels (FF type) having a continuously variable transmission, and more particularly, to a structure of the continuously variable transmission operatively and longitudinally connected to the engine and the transmission. And further, the prevent invention relates to a power unit for a four wheel drive motor vehicle of the same FF type.

Such a motor vehicle as having the engine longitudinally mounted on the motor vehicle and of the FF type has been known in the prior art. In the case of an automatic transmission type, the transmission for automatically changing an output shaft speed of the transmission is provided in the transmission.

In FIG. 7, a transmission having a conventional automatic transmission will be described. First, an engine 5 is mounted longitudinally on a motor vehicle body in an engine compartment 2 of a motor vehicle 1, a transmission 20 is operatively connected to the engine 5, and a torque converter 33, an automatic transmission 91, etc., are operatively connected in series with the engine 5. In the case where the entire length of the engine is short like a horizontally opposed type engine, a V-type engine, the engine 5 is disposed at a relatively forward side. Thus, a predetermined distance is assured between a rear end of the engine 5 and a toe board for partitioning the engine compartment 2 and a passenger room 3. Further, a transmission 20 in which a front differential 80 is interposed between a torque converter 33 and an automatic transmission 91 in an integral structure in consideration of a motor vehicle structure, a front wheel position, and etc. has been known.

In this type of the transmission 20, a steering gear box 6 is arranged directly under the torque converter 33, and a cross member 7 as a motor vehicle structural member is arranged on a periphery of the steering gear box 6. Thus, the front differential 80 is arranged at a position not interfered with the torque converter 33, the steering gear box 6 and the cross member 7, and axles for transmitting power to the right and left sides of the front differential 80 can be operatively connected to front wheels 8 at an optimum position without interface.

However, since the automatic transmission 91 is extended in a large length rearwardly in the transmission 20, the automatic transmission 91 encroaches upon the passenger room 3 from the toe board 4. Recently, the automatic transmission 91 becomes large because the number of stages of reduction gears increases. And a tunnel 14 having a relatively large sectional area is formed in the passenger room 3, and hence the automatic transmission 91 is housed in the tunnel 14 in a state encroaching upon the passenger room 3. Therefore, a resident range of the passenger room 3 is narrowed, and arrangements of an accelerator pedal 9, a brake pedal 10, etc., are limited. In addition, the toe board 4 is the partition in which a heavy matter cannot be mounted, and a space of the toe board 4 is not effectively utilized.

For automatically changing an output shaft speed of the transmission, a continuously variable transmission has been already proposed. According to the continuously variable transmission, the output shaft speed of the transmission is continuously changed, and hence power is not shut off, thereby improving a power transmitting efficiency. Further, output characteristics of the engine can be sufficiently utilized to improve a practical fuel consumption and to smoothly change the output shaft speed of the transmission without shift shock. Since a large ratio of speed difference can be set with a basic size, there is an advantage that a high reduction gear ratio at the time of cruising and preferable starting characteristics are compatible.

Further, the continuously variable transmission fundamentally has a primary pulley, a secondary pulley and a drive belt wound on both the pulleys in a very compact structure in which its axial length is shortened. Further, the secondary pulley can be arranged at an arbitrary position on a periphery of the primary pulley to provide advantages such as an increase of design freedom, an appropriate installation of a power transmission passage after the secondary pulley, etc. Then, a number of effects are expected by employing a continuously variable transmission as a transmission of an engine longitudinally mounted via the transmission.

Heretofore, as a transmission having a continuously variable transmission longitudinally mounted via the transmission, Japanese Patent Laid-Open Publication No. 89068/1976 is, for example, disclosed. In the continuously variable transmission, an output pulley is arranged under an input pulley, an output shaft of the output pulley is extended straightly to an engine side, and operatively connected to a differential arranged directly under the engine.

In Japanese Patent Laid-Open Publication No. 96654/1979, an engine is operatively connected to a continuously variable transmission via a centrifugal clutch and a forward/reverse changeover planetary gear mechanism. Further, a belt wheel at an input side of the continuously variable transmission is operatively connected to an axle through a clutch, and a belt wheel of an output side is operatively connected to the axle through a clutch and a gear unit.

In Japanese Patent Laid-Open Publication No. 150539/1990, a secondary shaft of a continuously variable transmission is extended forwardly as a drive system of a front engine front and rear wheel drive part time vehicle, and operatively connected to a front wheel drive shaft through a pair of reduction gears. A differential case is arranged under a housing having a torque converter, a front differential is housed in the case, and a front wheel drive shaft is operatively connected to the front differential.

However, since the first prior art has a type in which the forward/rearward changeover apparatus is arranged at the output side of the continuously variable transmission, the continuously variable transmission is driven even at a neutral position to deteriorate power loss, fuel consumption, etc. Further, since the output pulley having a large shape, the forward/rearward changeover apparatus and the differential are arranged under the engine, an entire height is raised to cause various defects in an actually mounted state.

Since the second prior art is the rear wheel drive type by the engine mounted on the rearside of the vehicle, this cannot be applied to the FF type of the present invention.

Since the third prior art has a type in which the secondary shaft is operatively connected to the front differential via the pair of reduction gears, number of degrees of freedoms of determining a reduction gear ratio and a positional relationship between the secondary shaft and the front differential is defective. Since the front differential is arranged under the torque converter, an entire height is raised similarly to the first prior art in the case of mounting in the motor vehicle.

A four wheel drive motor vehicle having a power unit longitudinally mounted on the motor vehicle and a part time or a full time drive four wheel system of a front engine front wheel drive type has been known in the prior art. In this case, in an automatic transmission type, a transmission for automatically changing an output shaft speed of the transmission is provided in the transmission portion of the power unit.

In FIG. 12, a power unit of a four wheel drive motor vehicle having a conventional automatic transmission will be described. First, a power unit 100 having an engine 5 is mounted longitudinally of a motor vehicle body in an engine compartment 2 of a motor vehicle 1. A torque converter 33, an automatic transmission 101 and a transfer apparatus 90 are connected and coaxially arranged to the engine 5 in the power unit 100. In the case where the entire length of the engine is short with a horizontal opposed type engine, or a V-type engine, the engine 5 is mounted at a relatively forward side. Thus, a predetermined distance is assured between a rear end of the engine 5 and a toe board for partitioning the engine compartment 2 and a passenger room 3. Further, an automatic transmission 100A in which a front differential 80 is interposed between a torque converter 33 and an automatic transmission apparatus 101 in an integral structure in consideration with a distance between the engine 5 and the toe board 4, a motor vehicle body structure, a front wheel position, has been known.

According to the automatic transmission 100A, a steering gear box 6 is arranged directly under the torque converter 33, and a cross member 7 as a motor vehicle structural member is arranged on a periphery of the steering gear box 6. Thus, the front differential 80 is arranged at a position without interference by the torque converter 33, the steering gear box 6 and the cross member 7, and axles to be output to the right and left sides of the front differential 80 can be operatively connected to the front wheels 8 arranged at the optimum position.

However, in the automatic transmission apparatus 101 of the automatic transmission 100A, mechanical components 101a of a planetary gear, a clutch and a brake, and a valve block 101b to be controlled at a reduction gear ratio are extended rearwardly in a large length and in a large sectional area. Therefore, the automatic transmission apparatus 10 having a large volume occupies in the passenger room 3 from the toe board 4. Recently, as the automatic transmission apparatus 101 becomes large for containing number of the reduction gears, a tunnel 14 having a relatively large sectional area is formed in the passenger room 3, and hence the automatic transmission apparatus 101 is housed in the tunnel 14 in a state encroaching upon the passenger room 3. Therefore, the space of the passenger room 3 is narrowed, and arrangements of an accelerator pedal 10, a brake petal 9, and etc., are limited. In addition, the toe board 4 is the partition in which a heavy component cannot be mounted, and a space of the toe board 4 is not effectively utilized.

As a transmission for automatically changing an output shaft speed of the transmission, a continuously variable transmission has been already proposed. In the continuously variable transmission, the output shaft speed of the transmission is continuously changed, and hence the power is not shut off, thereby improving a power transmitting efficiency. Further, output characteristics of the engine can be sufficiently utilized to improve a practical fuel consumption and to hence smoothly change the output shaft speed of the transmission without shift shock. Since a large speed shift ratio can be set with a basic size, there is an advantage that a high reduction gear ratio at the time of cruising and preferable starting characteristics are compatible.

Further, the continuously variable transmission fundamentally has a primary pulley, a secondary pulley and a drive belt wound on both the pulleys in a very compact structure in which its axial length is shortened. Further, the secondary pulley can be arranged at an arbitrary position on a periphery of the primary pulley to provide advantages such as an increase of design freedom, an easy installation of a power transmission passage after the secondary pulley, etc. Then, a number of effects are expected by employing a continuously variable transmission by longitudinally mounting the transmission.

Heretofore, as a four wheel drive motor vehicle of a front engine front wheel drive type having a power unit assembled with a continuously variable transmission longitudinally mounted via the engine, Japanese Patent Laid-Open Publication No. 150539/1990 is, for example, disclosed. In this prior art, a continuously variable transmission has a primary pulley of an input side and a secondary pulley of an output side mounted in vertical direction. A secondary shaft is extended forwardly, and operatively connected to a front drive shaft through a pair of reduction gears. A front differential is housed in a differential case under a housing having a torque converter, and the front drive shaft is operatively connected to transmit power to the front differential. On the other hand, a speed reduction apparatus having a changeover brake is operatively connected to a rear portion of the secondary shaft, and power is transmitted from the speed reduction apparatus to a rear differential through a propeller shaft, etc.

However, since the prior art has a structure in which the primary pulley, the secondary pulley of the continuously variable transmission, the torque converter, and the front differential are arranged in the vertical direction, an entire height becomes high. In the case where they are mounted in the motor vehicle so as not to interfere with the steering gear box and the cross member, it is required to modify a vehicle body structure. Since the reduction gear and the speed reduction apparatus are divided and mounted at the front and the rear portions of the secondary shaft, the structure and the space are disadvantageous. Further, there is a defect that a power output position of a rear wheel side is limited by the mounted secondary pulley.

SUMMARY OF THE INVENTION

An object of the present invention is to provide a motor vehicle having an engine longitudinally mounted via a continuously variable transmission which has a compact structure in view of the above-described defects of the prior arts and in which the engine longitudinally mounted via the transmission can be arranged in an engine compartment without modifying a vehicle body structure.

In order to achieve the above object, this invention provides a motor vehicle of a FF type having an engine longitudinally mounted on a front side of said motor vehicle via a continuously variable transmission, an improvement of the motor vehicle which comprises:

a starting clutch operatively connected to the engine for engaging and disengaging the power to the wheel; a changeover apparatus directly and coaxially interposed between the starting clutch and the continuously variable transmission for changing a moving direction of the motor vehicle forwardly and rearwardly; a speed reduction apparatus functionally connected to the continuously variable transmission just under an intermediate position between the changeover apparatus and the continuously variable transmission for reducing an output shaft speed of the continuously variable transmission and for changing a transmitting direction of the power; a front differential perpendicularly suspended under the speed reduction apparatus such that an axis of the differential crosses at a right angle of an axis of the speed reduction apparatus and integrally housed in a case with the transmission and the speed reduction apparatus for absorbing a speed difference between left and right wheels; and the transmission is mounted in parallel with the engine at a front position of a toe board in an engine compartment so as to efficiently minimize a size and weight and to largely optimize comfortability and an arrangement of equipments in the motor vehicle.

According to the present invention, the transmission has the starting clutch, the forward/rearward changeover apparatus, the continuously variable transmission, the speed reduction apparatus and the front differential, and is constructed in a compact integral structure. Therefore, in the case where the compact transmission is operatively connected to the engine longitudinally mounted via the transmission, the transmission can be mounted on a front side of the toe board in the engine compartment to eliminate occupying largely the passenger room. Since the front differential is arranged directly under the forward/rearward changeover apparatus and the continuously variable transmission, the power can be transmitted to the front wheels of the optimum position without interfering with the cross member. The steering gear box and the cross member can be arranged under the starting clutch without trouble, and hence the vehicle body structure may not be altered.

In the motor vehicle having the engine longitudinally mounted on the vehicle and operatively connected to the transmission, power of the engine is inputted to the continuously variable transmission at the forward position of the forward/rearward changeover apparatus. The output shaft speed of the continuously variable transmission can be continuously shifted, and the speed shifting power of the continuously variable transmission is shifted to a low output shaft speed by the speed reduction apparatus. So that, the transmitting direction of the power is changed, and transmitted to the front differential. Further, the power is transmitted to drive the right and left front wheels by the front differential, and the motor vehicle is hence driven forwardly by the front engine front wheel drive type. In this case, the motor vehicle can be smoothly speed-shifted under the control of the output shaft speed of the continuously variable transmission.

Another object of the present invention is to provide a motor vehicle having a four wheel drive type engine longitudinally mounted via a continuously variable transmission having a power unit which has a compact structure so as to reduce installing upon a passenger room and to arrange equipments in an engine compartment without modifying a vehicle body structure.

In order to achieve the another object of the present invention, there is provided a motor vehicle having an engine longitudinally mounted on a front side of the motor vehicle for outputting power to drive four wheels via a continuously variable transmission, an improvement of the motor vehicle which comprises:

a starting clutch operatively connected to the engine for engaging and disengaging the power to the four wheels;

a changeover apparatus directly and coaxially interposed between the starting clutch and the continuously variable transmission for changing a moving direction of the motor vehicle forwardly and rearwardly;

a speed reduction apparatus functionally connected to the continuously variable transmission just under an intermediate position between the changeover apparatus and the continuously variable transmission for reducing an output shaft speed of the continuously variable transmission and for changing a transmitting direction of the power;

a front differential perpendicularly suspended under the speed reduction apparatus such that an axis of the differential crosses at a right angle of an axis of the speed reduction apparatus and integrally housed in a case with the transmission and the speed reduction apparatus for transmitting the power to left and right front wheels and for absorbing a speed difference between thereof;

a transfer apparatus provided after the speed reduction apparatus for transmitting the power to left and right rear wheels; and the transmission is mounted in parallel with the engine at a front position of a toe board in an engine compartment so as to efficiently minimize a size and weight and to largely optimize comfortability and an arrangement of equipments in the motor vehicle.

This invention also provides a power unit of a four wheel drive type an engine longitudinally mounted via a continuously variable transmission which has a compact structure so as to reduce encroaching upon a passenger room and to arrange equipments in an engine compartment without modifying a vehicle body structure.

According to the present invention with the above-described structure, the continuously variable transmission the power unit has the starting clutch, the forward/rearward changeover apparatus, the continuously variable transmission, the speed reduction apparatus, the front differential and the transfer apparatus, and is constructed in a compact integral structure. Therefore, in the case where the continuously variable transmission is operatively connected to the engine longitudinally mounted via the transmission, the speed reduction apparatus of the continuously variable transmission and a most forward portion of the continuously variable transmission can be mounted on a front side of the toe board in the engine compartment to eliminate installing upon the passenger room. Since the front differential is arranged directly under the forward/rearward changeover apparatus and the continuously variable transmission, power can be transmitted to the front wheels at the optimum position without interfering with the cross member. The steering gear box and the cross member can be arranged under the starting clutch without trouble, and hence the vehicle body structure may not be altered.

In the four wheel drive motor vehicle having the engine longitudinally mounted via the power unit operatively connected to the continuously variable transmission, power of the engine is inputted to the continuously variable transmission at the forward position of the forward/rearward changeover apparatus, the output shaft speed of the continuously variable transmission can be continuously shifted. The reduction gear power of the continuously variable transmission is reduced to a low output shaft speed of the continuously variable transmission by the speed reduction apparatus, The transmitting direction of the power is changed, and inputted to the front differential and further transmitted to drive the front wheels. Further, the reduction gear power of the speed reduction apparatus is outputted by the transfer apparatus, and the power responsive to the torque of the transfer clutch is transmitted to drive the rear wheels. Thus, the four wheel drive motor vehicle of the front engine front wheel drive type is traveled forwardly. In this case, the motor vehicle can be smoothly speed-shifted under the control of the output shaft speed of the continuously variable transmission.

The nature, utility, and further features of this invention will be understood from the following detailed description with respect to preferred embodiments of the invention by referring the accompanying drawings, briefly described below.

DETAILED DESCRIPTION OF THE INVENTION

Figure 1:
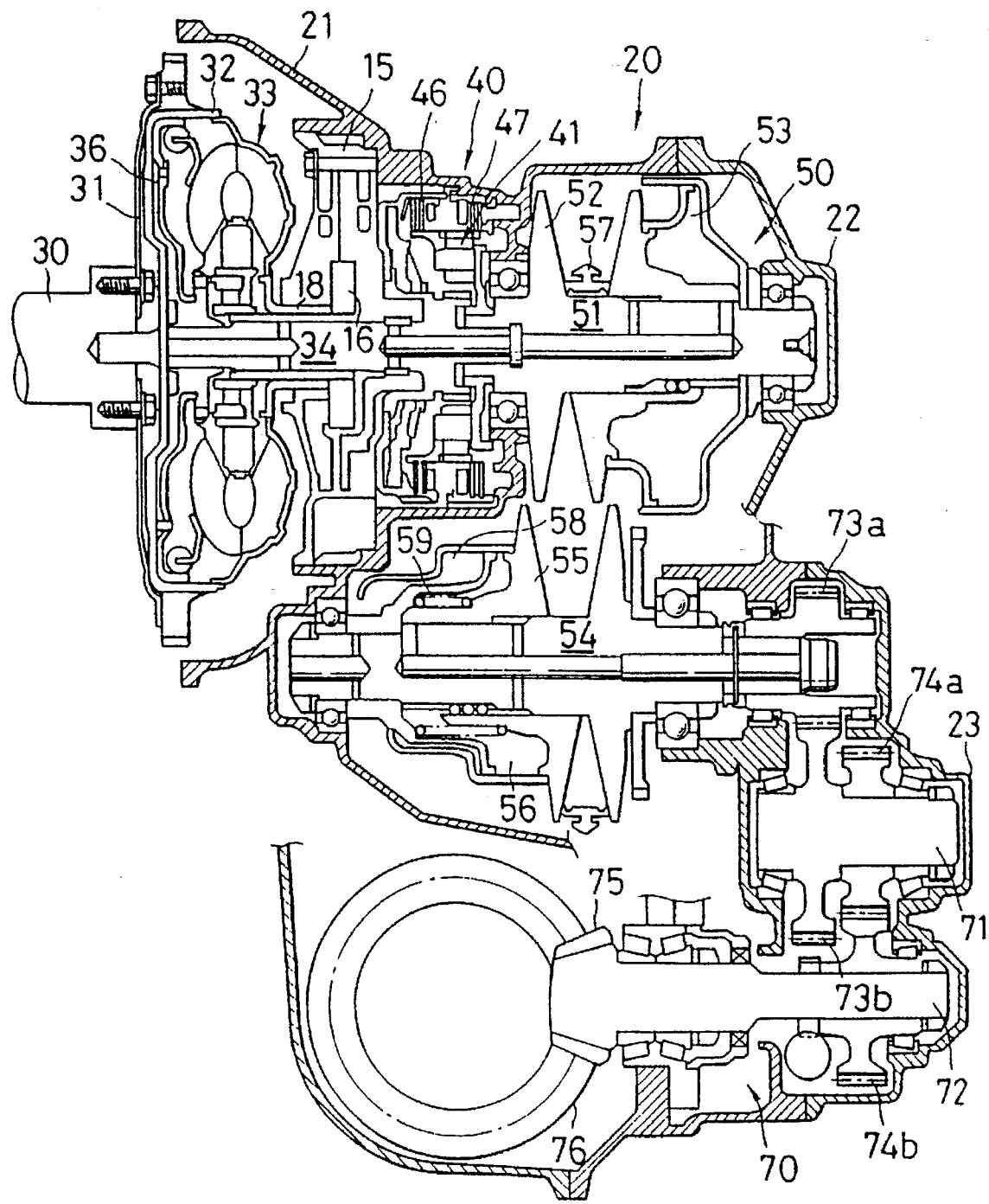
FIG. 1 is a sectional view showing a first embodiment of a transmission with a continuously variable transmission longitudinally mounted thereof according to the present invention.
Figure 2:
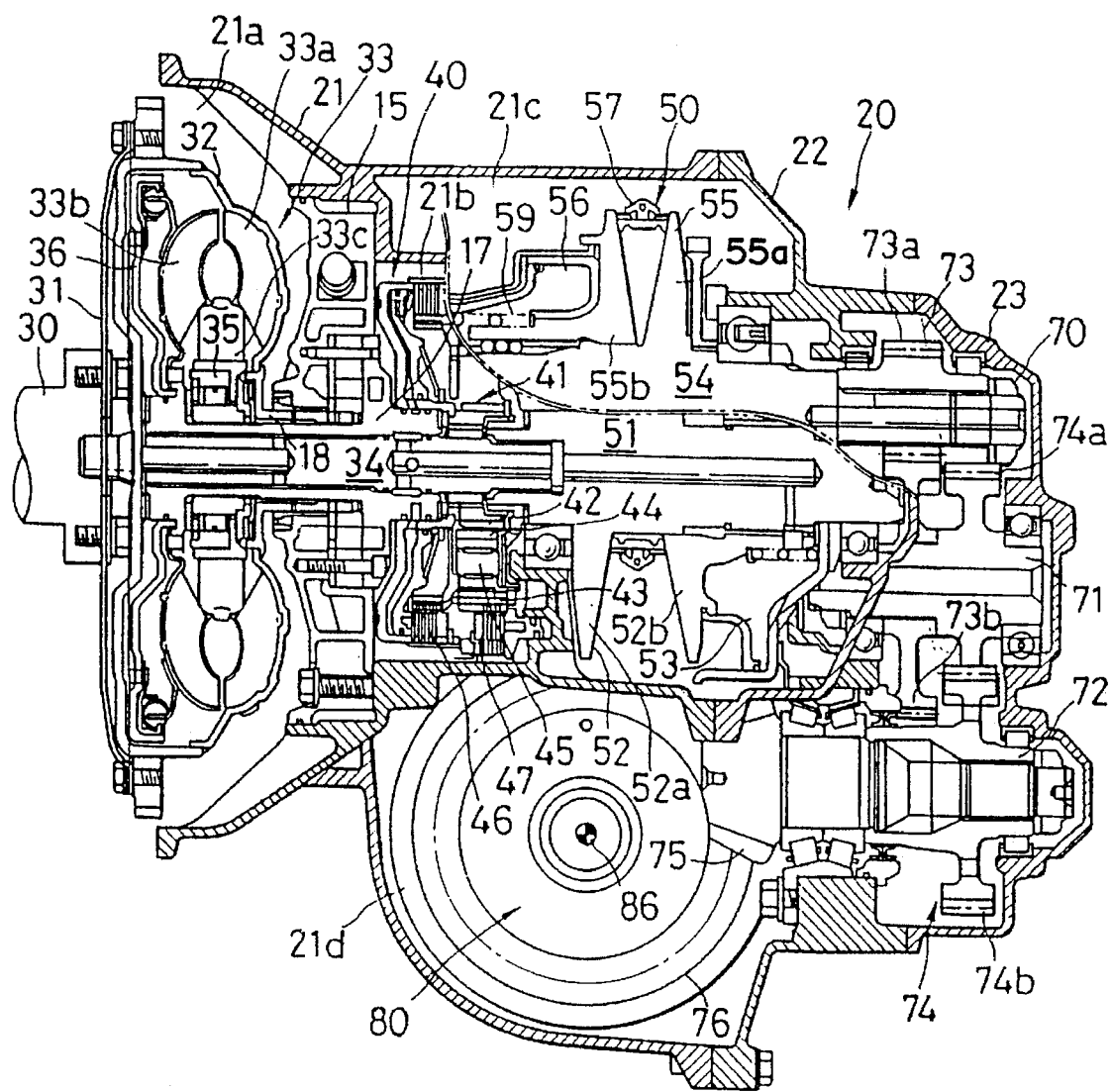
FIG. 2 is a longitudinally sectional view the transmission shown in FIG. 1.
Figure 3:
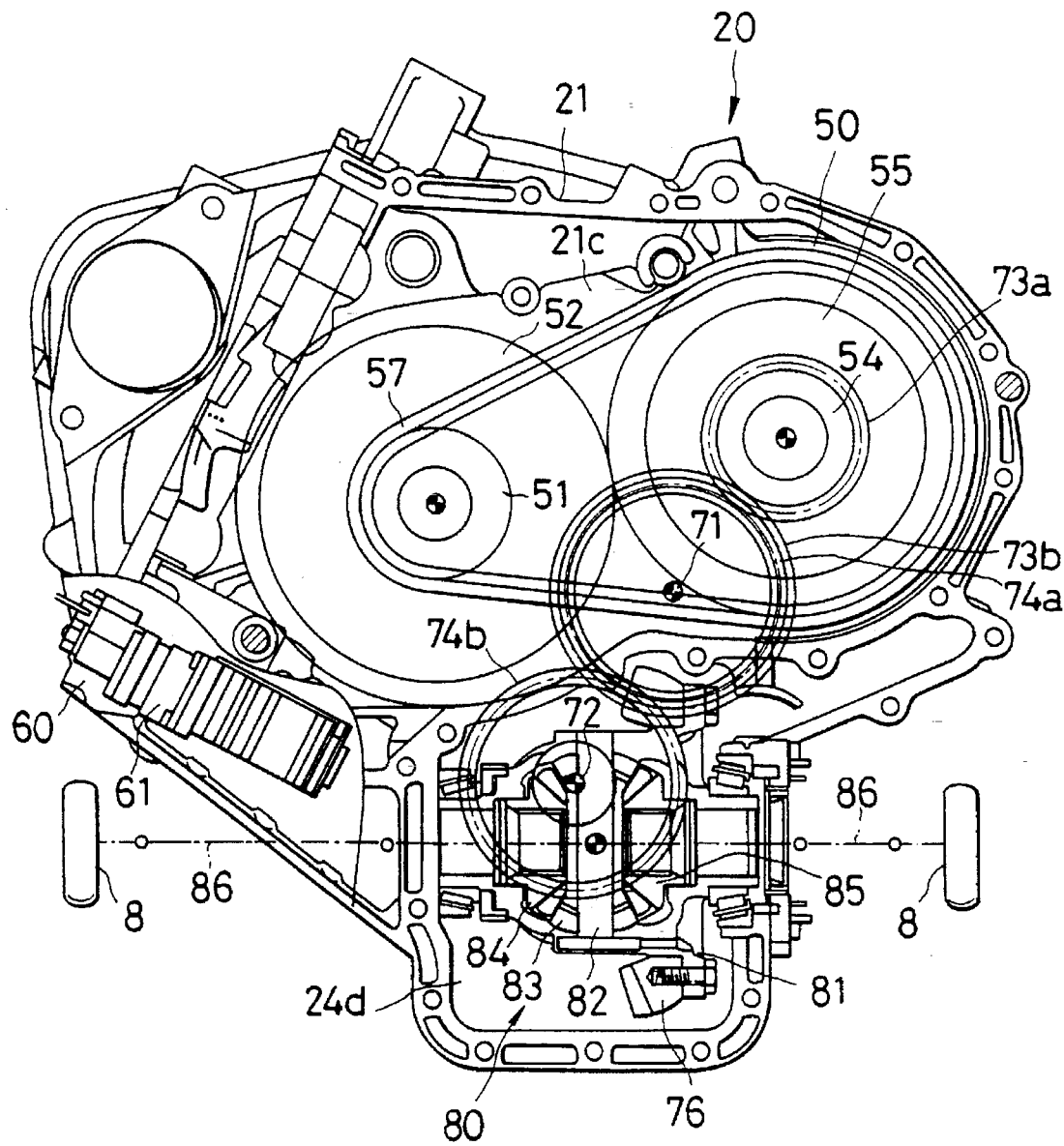
FIG. 3 is a laterally sectional view of the transmission shown in FIG. 1.

The embodiment of the present invention will be explained with reference to accompanying drawings. Referring to FIGS. 1 to 3, a transmission will be described. First, the entire general structure will be described. An engine, a toe board, a steering bear box, a cross member, and front wheels are arranged in an engine compartment without alteration, and a front differential is arranged under a speed reduction apparatus in this state without interfering the cross member and the front wheel drive. Thus, a wide space is provided above the front differential, and a transmission 20 is arranged to utilize the full longitudinal and lateral lengths in the vehicle body to its maximum limit.

The transmission 20 has a main case 21. A side case 22 and a rear cover 23 are connected integrally with the main case 21. In the main case 21, a forward housing room 21a is connected to the engine, a cylindrical changeover room 21b is operatively connected directly to a rear end of the forward housing room 21a, an elliptical transmission room 21c is operatively and laterally connected to a rear end of the changeover room 21b. A differential room 21d is arranged directly under the changeover room 21b and the transmission room 21c, and rear portions of the transmission room 21c and the differential room 21d are covered with the side case 22 and the rear cover 23.

As a starting clutch, a torque converter 33 having a lock-up clutch 36 is integrally housed in the housing room 21a of the main case 21, a forward/rearward changeover apparatus 40 is integrally housed in the changeover room 21b, a continuously variable transmission 50 is integrally housed in the transmission room 21c, and they are arranged coaxially with the engine 5. Further, a front differential 80 is integrally housed in the differential room 21d, and the front differential 80 is perpendicularly arranged directly under the forward/rearward changeover apparatus 40 and the continuously variable transmission 50. Moreover, a speed reduction apparatus 70 is so integrally housed in the side case 22 and the rear cover 23 as to be operatively connected to the continuously variable transmission 50 and the front differential 80 in an integral structure.

A drive system of the transmission 20 will be described in more detail. First, a crankshaft 30 of the engine 5 (not shown) is operatively connected to a converter cover 32 and a pump impeller 33a of the torque converter 33 through a drive plate 31. A turbine runner 33b of the torque converter 33 is operatively connected to a turbine shaft 34, and a stator 33c is guided by a one-way clutch 35. The lock-up clutch 36 is integrally connected to the turbine runner 33b, the lock-up clutch 36 engages and/or disengages the converter cover 32 operatively connected to the drive plate 31 to transmit power of the engine through the torque converter 33 or the lock-up clutch 36.

In the forward/rearward changeover apparatus 40, a primary shaft 51 of the continuously variable transmission 50 is coaxially arranged on the turbine shaft 34, and a double pinion type planetary gear 41 is provided on the turbine shaft 34 and the primary shaft 51. The double pinion type planetary gear 41 has a sun gear 42, a ring gear 43 and a carrier 45 for supporting two sets of pinions 44 such that the turbine shaft 34 is operatively connected to the sun gear 42 and that the primary shaft 51 is operatively connected to the carrier 45.

A forward clutch 46 is interposed directly and coaxially between the sun gear 42 and the ring gear 43, and a reverse brake 47 is interposed directly and coaxially between the ring gear 43 and the main case 21. The forward clutch 46 is engaged to integrate the planetary gear 41 to set a forward position in which the turbine shaft 34 is connected directly to the primary shaft 51. The reverse clutch 47 is engaged to lock the ring gear 43 to set a rearward position in which reverse power is output to the primary shaft 51. The forward clutch 46 and the reverse clutch 47 are disengaged to allow the planetary gear 41 to be free to be set to a neutral position.

The continuously variable transmission 50 has the primary shaft 51 and a secondary shaft 54 in parallel. The primary shaft 51 and the secondary shaft 54 are all mounted longitudinally of the vehicle body such that the primary shaft 51 is mounted at a relatively low position just the same level as the crankshaft 30, and the secondary shaft 54 is mounted at a high left side of the primary shaft 51. A primary pulley 52 is mounted on the primary shaft 51, a secondary pulley 55 is mounted on the secondary shaft 54, and a drive belt 57 is engaged between the pulleys 52 and 55.

The primary pulley 52 is so movably engaged with a stationary pulley 52a that a movable pulley 52b varies a pulley interval, and a primary cylinder 53 as being used as a piston is operatively connected to the movable pulley 52b. The secondary pulley 55 is similarly constructed to have a stationary pulley 55a, a movable pulley 55b and a secondary cylinder 56. A balance room 58 is further provided in the secondary cylinder 56, and an initially set spring 59 is energized to the movable pulley 55b. In this case, the primary cylinder 53 is so set that the secondary cylinder 56 has larger pressure receiving area than that of the primary cylinder 53.

A valve body 60 is mounted in the main case 21. A control valve 61 for electronically controlling a line pressure, a primary pressure, etc., is provided in the valve body 61, and a hydraulic oil circuit is so constructed that at least a line pressure oil passage communicates with the secondary cylinder 56 and a primary pressure oil passage communicates with the primary cylinder 53. The line pressure responsive to a transmitting torque is always supplied to the secondary cylinder 56 to so clamp it as not to cause the belt to slip. The primary pressure is supplied to the primary cylinder 53 in this state in response to traveling conditions, and a ratio of winding diameters of the primary pulley 52 to the secondary pulley 55 of a drive belt 57 is changed by the primary pressure to continuously change the output shaft speed of the continuously variable transmission 50.

Since a speed reduction ratio of the continuously variable transmission 50 is set a small value, for example, 0.5 to 2.5, the speed reduction apparatus 70 corrects the ratio to the same gear ratio as that of the ordinary transmission. The power for changing the output shaft speed of the continuously variable transmission 50 is converted to be outputted from the continuously variable transmission 50 longitudinally of the vehicle body to a lateral direction of the vehicle body. And, the power is transmitted to the front differential 80. Then, a counter shaft 71 and a pinion shaft 72 are mounted in parallel obliquely from the secondary shaft 54 toward the front differential 80 in a three-axis structure in a rear portion of the secondary shaft 54.

A small-diameter drive gear 73a of a reduction gear 73 is integrally connected to a rear portion of the secondary shaft 54, and the drive gear 73a is meshed with a large-diameter driven gear 73b of the counter shaft 71. A drive gear 74a of a counter gear 74 is mounted on the counter shaft 71, and the drive gear 74a is meshed with the driven gear 74b of the pinion shaft 72. So that the output shaft speed of the continuously variable transmission is changed to a desired reduction gear ratio by the two sets of the gears 73 and 74. The shafts 71, 72 and the gears 73, 74 are supported by bearings 7 of the side case 22 and the rear case, and a drive pinion 75 at a front end of the pinion shaft 72 is inserted into the differential room 21d.

In the front differential 80, a differential case 81 is rotatably mounted in a left-and-right (lateral) direction of the vehicle body within the differential room 21d. The drive pinion 75 is meshed with a crown gear 76 of the differential case 81 such that an axis of the differential crosses at a right angle of an axis of the speed reduction apparatus 70 in order to finally shift to a desired reduction gear ratio for absorbing a speed difference between left and right wheels and for changing a power transmitting direction. As a pinion 83 is mounted on a pinion shaft 82 in the differential case 81, left and right side gears 84, 85 are meshed with the pinion 83, and operatively connected to left and right front wheels 8 via an axle 86.

In the transmission 20, the torque converter 33, the forward/rearward changeover apparatus 40, the continuously variable transmission 50, the speed reduction apparatus 70 and the front differential 80 are integrally assembled in the side case 22 and the rear cover 23. Therefore, an axial length is short and the continuously variable transmission becomes large to the right and left sides, and further the differential protrudes downwardly.

On the other hand, in order to obtain a hydraulic source for controlling the continuously variable transmission, a partition wall 15 is fixed by bolts between the housing room 21a and the changeover room 21b of the main case 21, and a stationary member 17 for supporting an oil pump 16 and a one-way clutch 35 of the torque converter 33 are mounted at the partition wall 15. The oil pump 16 is operatively connected to a converter cover 32 through a pump drive shaft 18 to drive the pump when the engine is operated.

Figure 4:
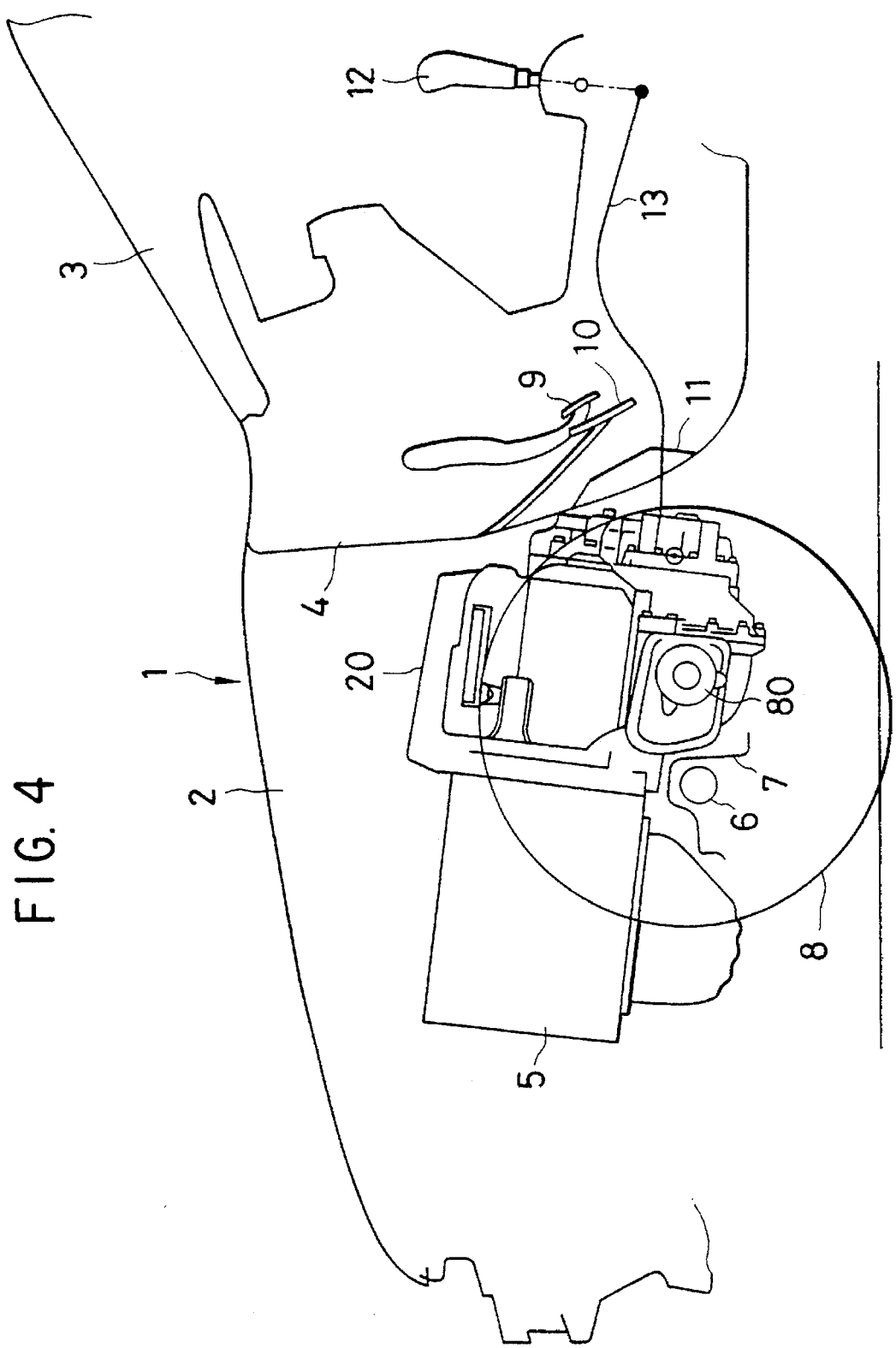
FIG. 4 is a sectional view showing a vehicle with an engine and the transmission longitudinally mounted on the vehicle.

Referring to FIG. 4, a mounting state of the motor vehicle will be described. A motor vehicle 1 has an engine compartment 2 in a front portion, and a passenger room 3 is partitioned from the engine compartment 2 by a toe board 4. The transmission 20 is connected and longitudinally mounted in the front-and-rear direction from the longitudinally mounted engine 5 in the engine compartment 2. Since the transmission 20 has a short axial length and a shape swelled at left and right and down sides as described above, the front end space of the toe board 4 is effectively utilized, and the transmission 20 is arranged in the engine compartment 2 without interfering with the toe board 4. Thus, the transmission 20 is not installed in the passenger room 3, and the toe board 4 does not have a tunnel. A steering box 6 and a cross member 7 are arranged directly under the torque converter 33 at a front end of the transmission 20 unlike the prior art. The front differential 80 under the transmission 20 is mounted directly behind the cross member 7 and the front wheels 8 mounted at suitable positions to transmit power to the wheels 8 without fail.

The transmission 20 is not installed in the passenger room 3, the toe board 4 does not have a tunnel, and the passenger room 3 is minimized. A clutch pedal 9, a brake pedal 10, a foot rest 11, and etc., are arranged at the optimum position at a driver's seat side. A select lever 12 is operatively connected to a valve body through a cable 3, and can operate the forward/reverse changeover apparatus 40 into ranges such as a drive D, a reverse R, a neutral N, etc.

An operation of this embodiment will be described. First, when the select lever 12 is set to the N range, the forward/reverse changeover apparatus 40 is set to a neutral position to shut off a driving system. When the engine 5 is operated in the N range, the oil pump 16 is driven by the engine 5 through the converter cover 32 and the pump drive shaft 18 to supply oil to the torque converter 33, and the forward/reverse changeover apparatus 40 and the continuously variable transmission 50 can be hydraulically controlled. The power of the engine 5 is inputted to the turbine shaft 34 through the drive plate 31, the torque converter 33, etc.

When the select lever 12 is set to the D range, the forward/reverse changeover apparatus 40 is set to a forward position by the engagement of the forward clutch 46 to input engine power from the turbine shaft 34 to the primary shaft 51 of the continuously variable transmission 50 as it is. The continuously variable transmission 50 is controlled to a maximum reduction gear ratio in which the belt 57 is shifted most closely to the secondary pulley 55 at the time of starting to output the reduction gear power of the maximum reduction gear ratio to the secondary shaft 54. The reduction gear power is changed in the reduction gear ratio through the reduction gear 73, the counter shaft 71 and the counter gear 74 of the speed reduction apparatus 70 in a rear portion of the continuously variable transmission 50 and transmitted to the pinion shaft 72. The reduction gear power is changed in the transmitting direction to the left-and-right (lateral) direction of the vehicle body by the drive pinion 75 and the crown gear 76, and input to the front differential 80. The power is distributed to the left and the right in the front differential 80, the distributed powers are transmitted to the left and right front wheels 8 through the side gears 84, 85 and the axle 86 to drive the left and right front wheels 8, and hence the motor vehicle 1 is driven forwardly by the FF type driving system.

When the motor vehicle 1 is moved forwardly, a driving state of the motor vehicle 1 is judged by an electronic control system of the continuously variable transmission 50. When the vehicle is accelerated, the primary pressure of the primary cylinder 53 is raised, the drive belt 57 is sequentially shifted to the primary pulley 52 to shift up at the reduction gear ratio, and the continuously variable transmission 50 reaches a high-speed stage of a minimum reduction gear ratio. When the vehicle is decelerated at the time of shifting the reduction gear ratio, the drive belt 57 is again shifted to the secondary pulley 55 in accordance with a decrease in the primary pressure of the primary cylinder 53 to shift down at the reduction gear ratio. When the motor vehicle, is stopped, the continuously variable transmission 50 is returned to a low-speed stage of a maximum reduction gear ratio. Thus, the continuously variable transmission 50 is smoothly shifted to the desired reduction gear ratio in response to the operating condition of the motor vehicle 1.

When the select lever 12 is set to the R range, the forward/reverse changeover apparatus 40 is set to a reverse position by engaging the reverse brake 47. And then, the engine power is transmitted to the reverse direction via the continuously variable transmission 50. The reverse power fixed to the maximum reduction gear ratio is outputted from the continuously variable transmission 50 to the front wheels 8 as the above-mentioned description, and hence the motor vehicle 1 is moved in the reverse direction.

Figure 5:
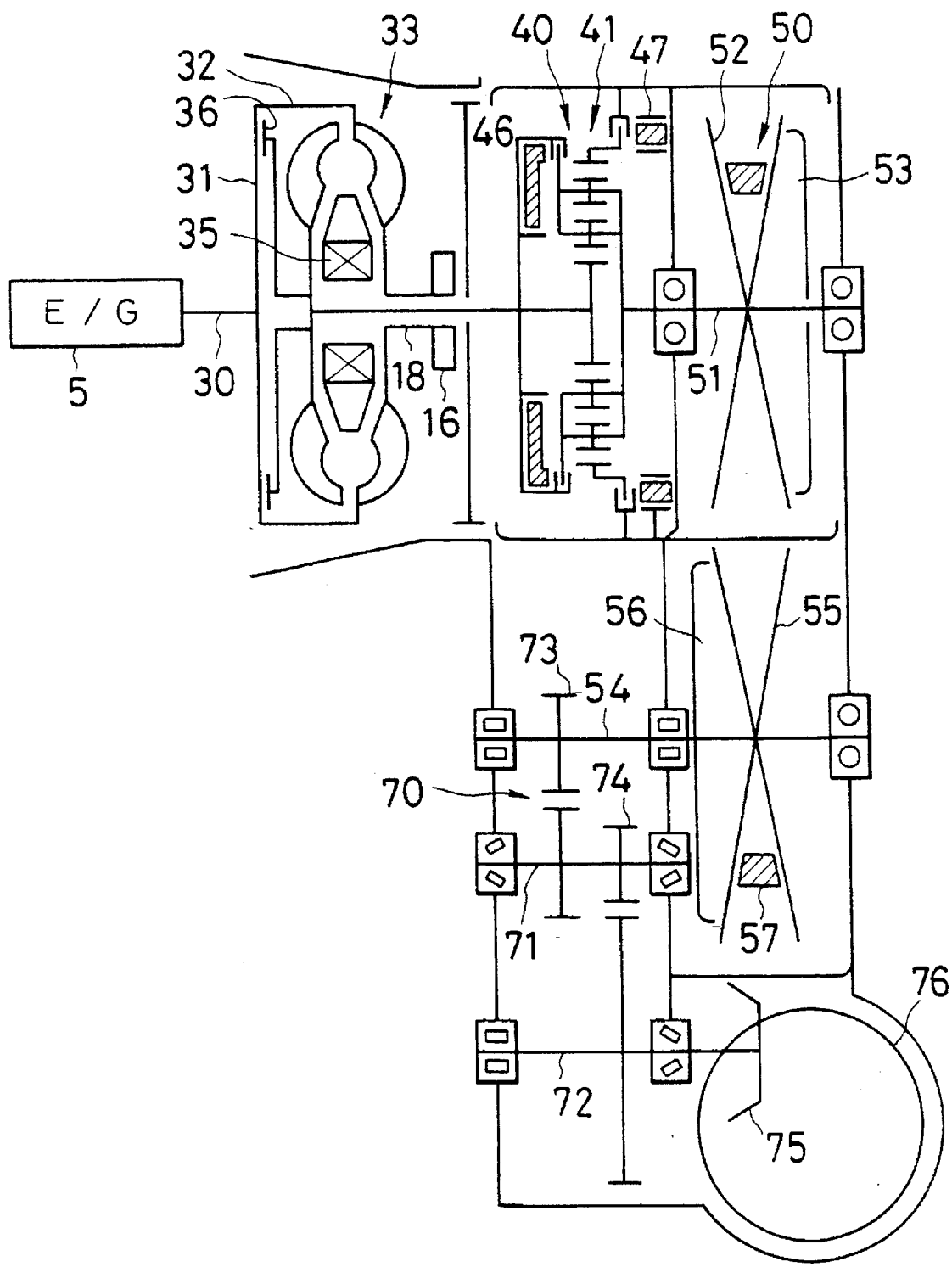
FIG. 5 is a schematic view showing another embodiment of the present invention.

Referring to FIG. 5, a second embodiment of the present invention will be described. In the first embodiment described above, the power is outputted from the rear end of the secondary shaft 54, and transmitted to the speed reduction apparatus 70. However, the power can be also outputted from a front end of the secondary shaft 54 in order to avoid an interference with the portion of the forward/reverse changeover apparatus 40. In this second embodiment, a reduction gear 74, a counter shaft 74, a counter gear 74 and a pinion shaft 72 of the speed reduction apparatus 70 are provided in a front portion of the secondary shaft 54 of the continuously variable transmission 50, and the power is transmitted from the pinion shaft 72 to a front differential 80.

Figure 6A:
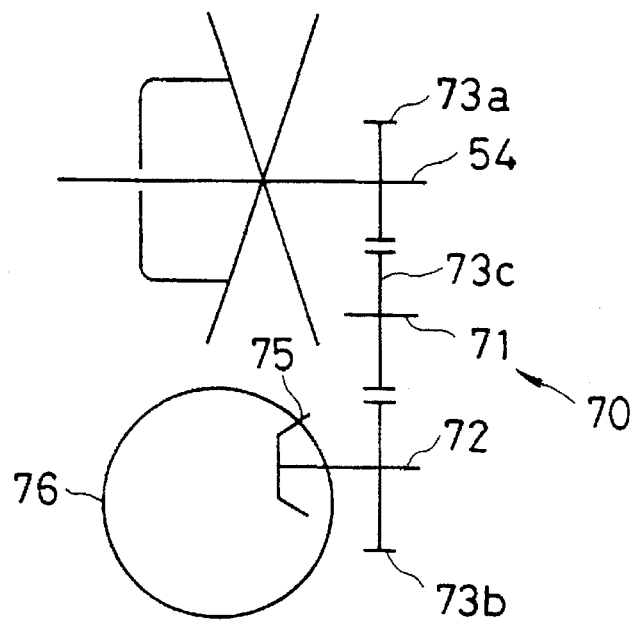
FIGS. 6a and 6b are schematic views showing the other embodiment of a speed reduction apparatus.
Figure 6B:
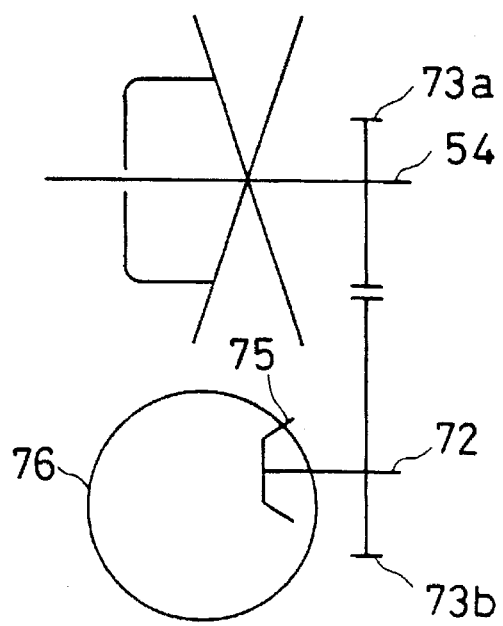
Figure 7:
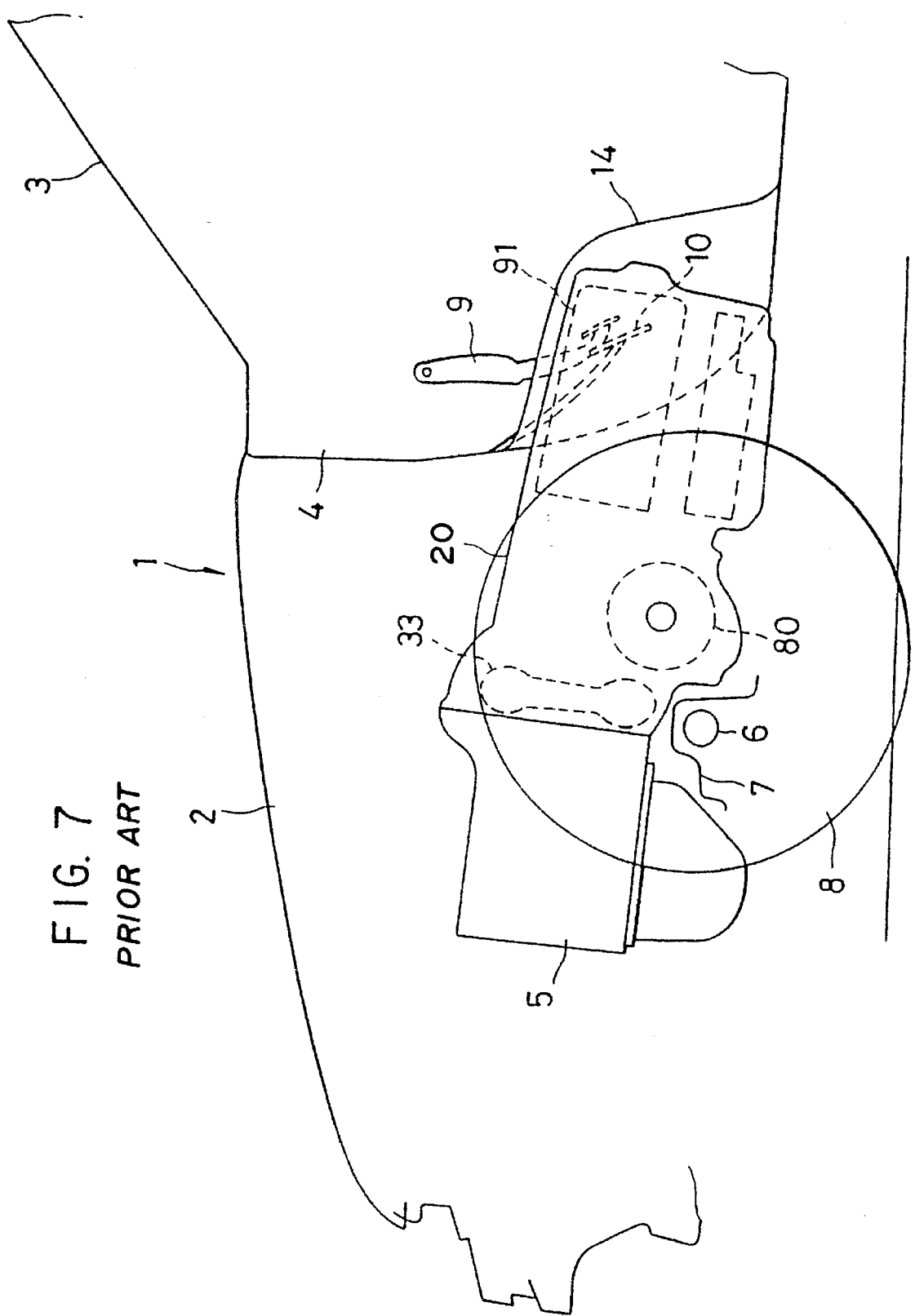
FIG. 7 is a sectional view showing a conventional vehicle with an engine longitudinally mounted.

Referring to FIGS. 6a and 6b, a third embodiment of the present invention will be described. In this third embodiment, a gear structure of a speed reduction apparatus 70 is modified. In FIG. 6a, a drive gear 73a of a secondary shaft 54 is meshed with a driven gear 73b of a pinion shaft 72 through a gear 73c of a counter shaft 71. In FIG. 6b, the drive gear 73a of the secondary shaft 54 is meshed directly with the driven gear 73b of the pinion shaft 72. In the third embodiment, the power is similarly reduced at a reduction gear ratio by a speed reduction apparatus 70, and the transmitting direction is changed. And the power is transmitted to a front differential 80.

A fourth embodiment of the present invention is now described hereinafter. The present invention is further applicable to the vehicle with the automatic clutch in place of the torque converter as the clutch. The present invention is also applicable to the four wheel drive system with the system of the FF type.

Figure 8:
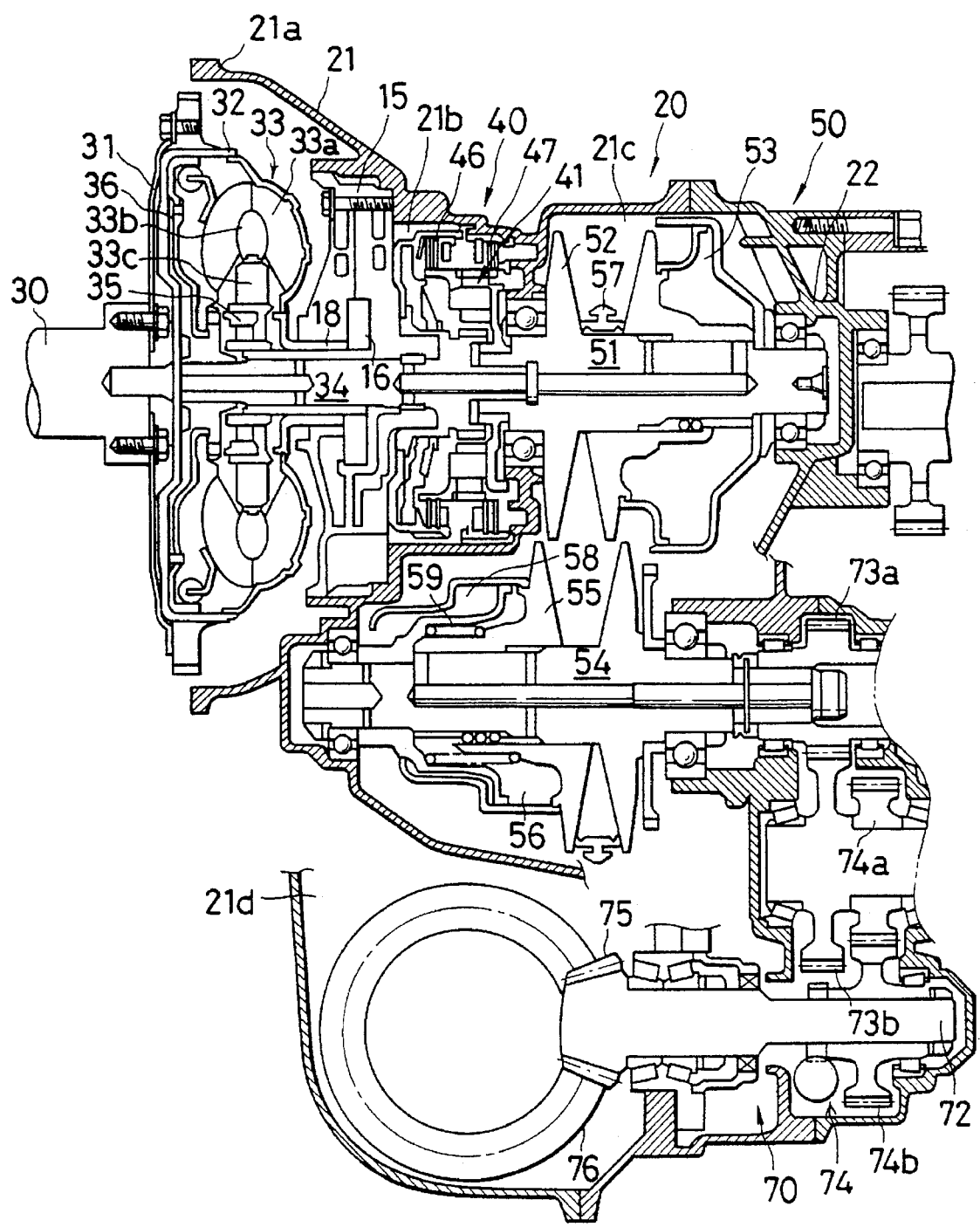
FIG. 8 is a sectional view showing a most forward portion of the other embodiment of the continuously variable transmission having a power unit.

A fifth embodiment of the present invention will be explained with reference to FIGS. 8 and 9.

The continuously variable transmission 20 has a main case 21. A side case 22 and an extension case 23 are connected integrally with the main case 21. In the main case 21, a forward housing room 21a is connected to the engine 5, a cylindrical changeover room 21b is operatively connected directly to a rear end of the forward housing room 21a, an elliptical transmission room 21c is operatively connected laterally to a rear end of the changeover room 21b. A differential room 21d is arranged directly under the changeover room 21b and the transmission room 21c, and rear portions of the transmission room 21c and the differential room 21d are covered with the side case 22 and the extension case 23.

A torque converter 33 having a lock-up clutch 36 is integrally housed in the housing room 21a of the main case 21, a forward/rearward changeover apparatus 40 is integrally housed in the changeover room 21b, a continuously variable transmission apparatus 50 is integrally housed in the transmission room 21c, and all are arranged coaxially with the engine 5. Further, a front differential 80 is integrally housed in the differential room 21d, and the front differential 80 is perpendicularly arranged directly under the forward/rearward changeover apparatus 40 and the continuously variable transmission apparatus 50.

Moreover, a speed reduction apparatus 70 is so integrally housed in the side case 22 and the extension case 23 as to be operatively connected to the continuously variable transmission apparatus 50 and the front differential 80. Further, a transfer apparatus 90 connected to the speed reduction apparatus 70 is housed in the extension case 23 in an integral structure.

A drive system of the continuously variable transmission 20 will be described more in detail. First, a crankshaft 30 of the engine 5 longitudinally mounted via the transmission is operatively connected to a converter cover 32 and a pump impeller 33a of the torque converter 33 through a drive plate 31. A turbine runner 33b of the torque converter 33 is operatively connected to a turbine shaft 34, and a stator 33c is guided by a one-way clutch 35. The lock-up clutch 36 is integrally connected to the turbine runner 33b, the lock-up clutch 36 is so mounted as to engage and disengage the converter cover 32 operatively connected to the drive plate 31 to transmit power of the engine through the torque converter 33 or the lock-up clutch 36.

In the forward/rearward changeover apparatus 40, a primary shaft 51 of the continuously variable transmission 50 is coaxially arranged on the turbine shaft 34, and a double pinion type planetary gear 41 is provided on the turbine shaft 34 and the primary shaft 51. The double pinion type planetary gear 41 has a sun gear 42, a ring gear 43 and a carrier 45 for supporting two sets of pinions 44 such that the turbine shaft 34 is operatively connected to the sun gear 42 and the primary shaft 51 is operatively connected to the carrier 45.

A forward clutch 46 is interposed directly and coaxially between the sun gear 42 and the ring gear 43, and a reverse brake 47 is directly and coaxially interposed between the ring gear 43 and the main case 21. The forward clutch 46 is engaged to integrate the planetary gear 41 to set a forward position in which the turbine shaft 34 is connected directly to the primary shaft 51. The reverse clutch 47 is engaged to lock the ring gear 43 to set a rearward position in which the power is outputted to the primary shaft 51 for turning reversely. The forward clutch 46 and the reverse clutch 47 are disengaged to allow the planetary gear 41 to be free to set at a neutral position.

The continuously variable transmission 50 has the primary shaft 51 and a secondary shaft 54 mounted in parallel with the primary shaft 51. The primary shaft 51 and the secondary shaft 54 are all mounted in a line of longitudinal axis of the vehicle body such that the primary shaft 51 is mounted at a relatively low position coincident with the crankshaft 30, and the secondary shaft 54 is mounted at a high left side of the primary shaft 51. A primary pulley 52 is mounted on the primary shaft 51, a secondary pulley 55 is mounted on the secondary shaft 54, and a belt 57 is engaged between the pulleys 52 and 55.

The primary pulley 52 is so movably engaged with a stationary pulley 52a that a movable pulley 52b varies a pulley interval, and a primary cylinder 53 having a structure to be used also as a piston is operatively connected to the movable pulley 52b. The secondary pulley 55 is similarly constructed to have a stationary pulley 55a, a movable pulley 55b and a secondary cylinder 56, a balance room 58 is further provided in the secondary cylinder 56, and an initially set spring 59 is energized to push the movable pulley 55b. In this case, the primary cylinder 53 is so set that the secondary cylinder 56 has larger pressure receiving area than that of the primary cylinder 53.

A valve body 60 is mounted in the main case 21. A control valve 61 for electronically controlling a line and a primary pressures is provided in the valve body 61, and a hydraulic oil circuit is so constructed that at least a line pressure oil passage communicates with the secondary cylinder 56 and a primary pressure oil passage communicates with the primary cylinder 53. The line pressure responsive to a transmitting torque is supplied to the secondary cylinder 56 to push the belt 57 without slipping. The primary pressure is supplied to the primary cylinder 53 in accordance with the driving conditions, and a ratio of winding diameters of the primary pulley 52 and the secondary pulley 55 is changed by the primary pressure to continuously change the output shaft speed of the continuously variable transmission 50.

Since a pulley ratio of the continuously variable transmission 50 is set to a small value, for example, 0.5 to 2.5, the speed reduction apparatus 70 corrects the pulley ratio to the same gear ratio as that of the ordinary transmission. And the direction of the power is changed from the continuously variable transmission 50 to a predetermined position of a lateral direction of the vehicle body. And the power is transmitted to the front differential 80. A counter shaft 71 and a pinion shaft 72 20 are mounted in parallel obliquely from the secondary shaft 54 toward the front differential 80 in a three-axis structure in a rear portion of the secondary shaft 54.

A small-diameter drive gear 73a of a reduction gear 73 is integrally connected to a rear portion of the secondary shaft 54, and the drive gear 73a is meshed with a large-diameter driven gear 73b of the counter shaft 71, and hence mainly reduced at a desired reduction gear ratio by the reduction gear 73. A drive gear 74a of a counter gear 74 is mounted on the counter shaft 71, the drive gear 74a is meshed with the driven gear 74b of the pinion shaft 72, the output shaft speed of the continuously variable transmission is changed by a desired reduction gear ratio of the two sets of the gears 73 and 74. The shafts 71, 71 and the gears 73, 74 are supported by various bearings 7 of the side case 22 and the rear case, and a drive pinion 75 at a front end of the pinion shaft 72 is inserted into the differential room 21d.

In the front differential 80, a differential case 81 is mounted rotatably in the lateral direction of the vehicle body in the differential room 21d. Therefore, the drive pinion 75 is so meshed with a crown gear 76 of the differential case 81 that the ratio is finally shifted to a desired reduction gear ratio for absorbing a speed difference between left and right wheels and changing a power transmitting direction as an axis of the differential crosses at a right angle of an axis of the speed reduction apparatus 70. A pinion 83 is mounted on a pinion shaft 82 in the differential case 81. The left and right side gears 84, 85 are meshed with the pinion 83. And the side gears 84, 85 are operatively connected to left and right front wheels 8 via an axle 86.

Figure 9:
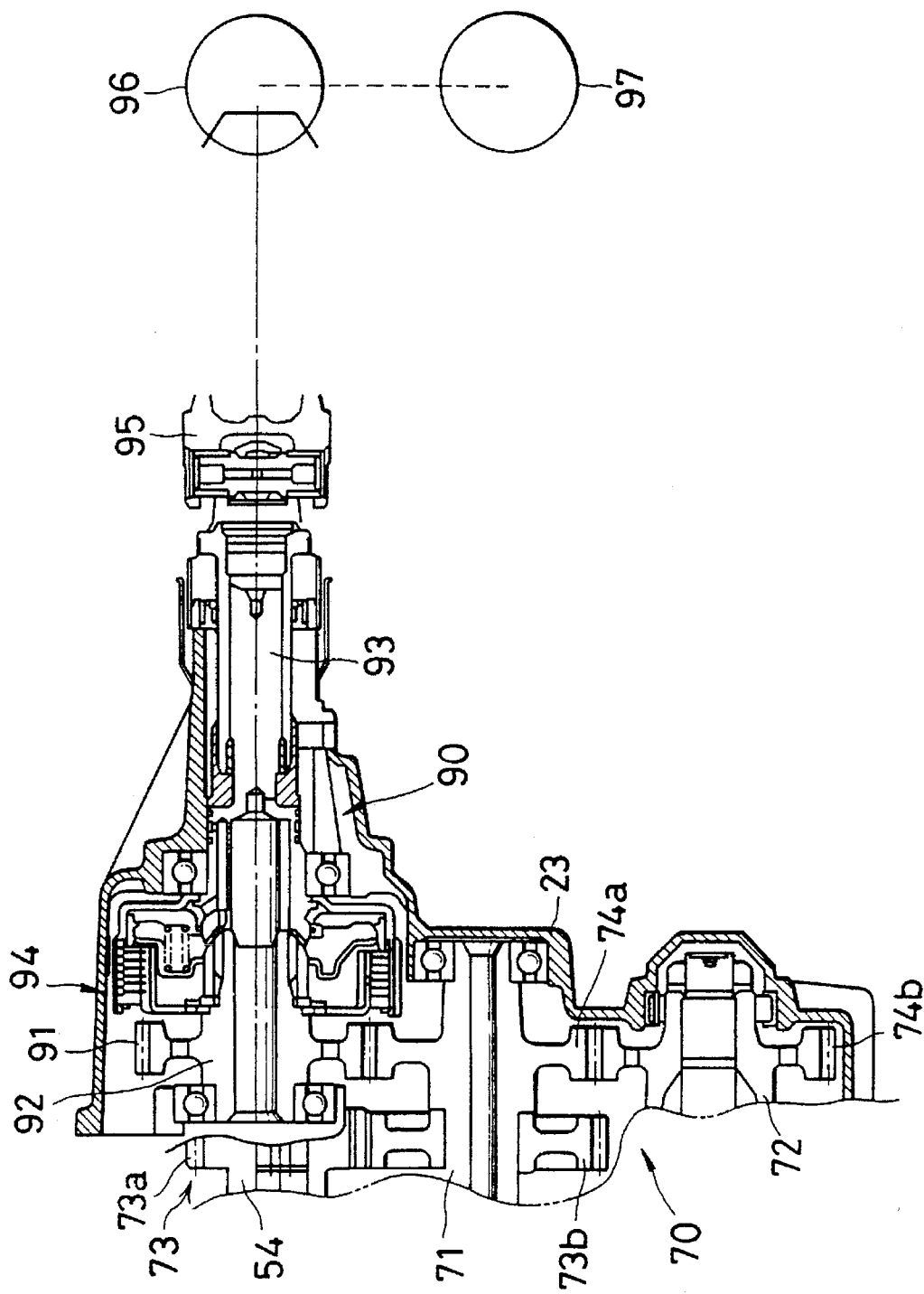
FIG. 9 is a longitudinal sectional view showing a rear portion of the other embodiment of the continuously variable transmission.

Referring to FIG. 9, the transfer apparatus 90 will be described. First, referring back to FIG. 3, a transfer shaft 92 is mounted in a rear portion of the vicinity of the primary shaft 51 coaxially arranged with the crankshaft 30 of the engine 5 in the extension case 23, and an output gear 91 of the transfer shaft 92 is so meshed with the drive gear 74b of the counter shaft 71 of the speed reduction apparatus 70 as to output reduction gear power at a desired distribution ratio. In this case, as the driven gears 74b has the same as diameter with that of the output gear 91, the reduction gear power is equally distributed to the pinion shaft 72 and the transfer shaft 92. A rear drive shaft 93 is coaxially arranged at a rear portion of the transfer shaft 92, and a transfer clutch 94 is interposed between the transfer shaft 92 and the rear drive shaft 93. The rear drive shaft 93 is operatively connected to a rear differential 96 through a propeller shaft 95 to transmit the power from the rear differential 96 to rear wheels 97.

The torque of the transfer clutch 94 is controlled by an electronic control in response to a manual operation or a front wheel slip state on a slippery road. The power responsive to the clutch torque is also transmitted to the rear wheels 97 so as to operate a four wheel drive of the motor vehicle.

In the continuously variable transmission 20, the torque converter 33, the forward/rearward changeover apparatus 40, the belt-driven continuously variable transmission apparatus 50, the speed reduction apparatus 70, the front differential 80 and the transfer apparatus 90 are integrally assembled in the side case 22 and the extension case 23. The entire shape of the integral structure is so formed that an axial length is short, the continuously variable transmission apparatus 50 is swelled to right and left sides and the front differential 80 protrudes downwardly, and the transfer apparatus 90 protrudes rearwardly.

On the other hand, in order to obtain a hydraulic source for controlling the continuously variable transmission, a partition wall 15 is provided between the housing room 21a and the changeover room 21b of the main case 21, and a stationary member 17 for supporting an oil pump 16 and a one-way clutch 35 of the torque converter 33 is mounted at the partition wall 15. The oil pump 16 is so operatively connected to a converter cover 32 through a pump drive shaft 18 as to drive the pump 16 when the engine is driven.

Figure 10:
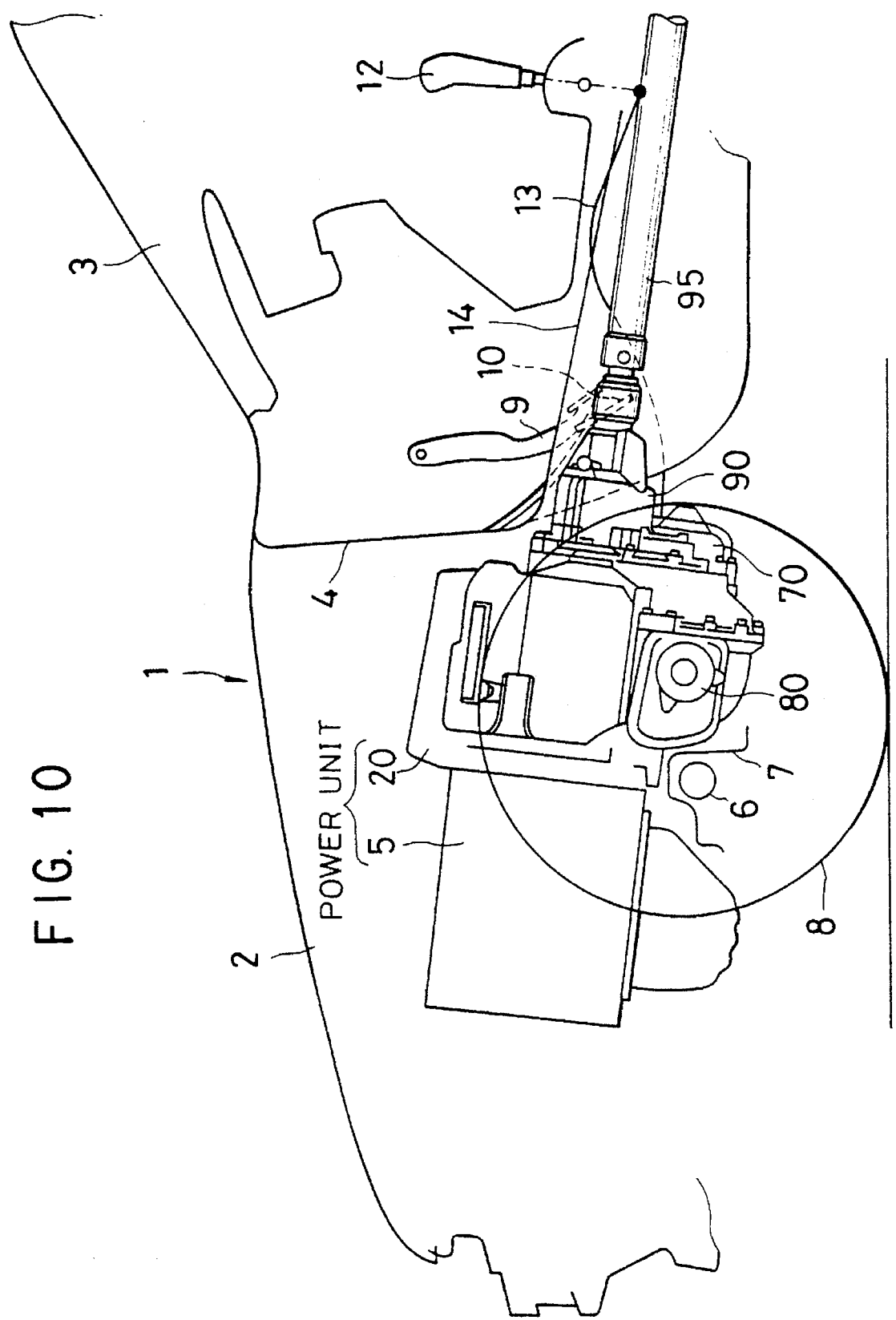
FIG. 10 is a sectional view showing a vehicle with the power unit.

Referring to FIG. 10, a mounting state of the motor vehicle will be described. A motor vehicle 1 has an engine compartment 2 in a front portion, and a passenger room 3 is partitioned from the engine compartment 2 by a toe board 4. The continuously variable transmission 20 is connected and longitudinally mounted in the front-and-rear direction from the longitudinally mounted engine 5 in the engine compartment 2. Since the continuously variable transmission 20 has a short axial length and a shape swelled at left and right, down and rear sides as described above, the speed reduction apparatus 70 and a most front portion of the speed reduction apparatus 70 are mounted in the engine compartment. 2 in a front portion of the toe board 4 by effectively utilizing a front space of the toe board 4.

Thus, small-diameter portions of the transfer clutch 94, the rear drive shaft 93, the propeller shaft 95, etc., behind the continuously variable transmission 20 are arranged under the passenger room 3 through the tunnel 14. A steering box 6 and a cross member 7 are arranged securely and similarly to the prior art directly under the torque converter 33 at a front end of the transmission 20. The front differential 80 suspended under the continuously variable transmission 20 is mounted directly behind the cross member 7 and front wheels 8 at a suitable position to transmit the power to the front wheels 8 without fail.

The continuously variable transmission 20 is not provided upon the passenger room 3, so that, the passenger room 3 becomes wider than others. A brake pedal 9, an accelerator pedal 10, etc., are arranged at the optimum position at a driver's seat side. A select lever 12 is operatively connected to a valve body through a cable 3, and therefore the driver can operate easily the forward/reverse changeover apparatus 40 in response to ranges such as a drive D, a reverse R, a neutral N, and etc.

An operation of the fifth embodiment will be described hereinafter. First, when the select lever 12 is set to the N range, the forward/reverse changeover apparatus 40 is set to a neutral position to shut off a driving system. When the engine 5 is operated in the N range, the oil pump 16 is driven by the engine 5 through the converter cover 32 and the pump drive shaft 18 to supply the oil to the torque converter 33, and the forward/reverse changeover apparatus 40 and the continuously variable transmission 50 can be hydraulically controlled. The power of the engine 5 is inputted to the turbine shaft 34 through the drive plate 31, the torque converter 33, and etc.

When the select lever 12 is set to the D range, the forward/reverse changeover apparatus 40 is set to a forward position by engaging the forward clutch 46 to input the power from the turbine shaft 34 to the primary shaft 51 of the continuously variable transmission 50. The continuously variable transmission 50 is controlled to a maximum reduction gear ratio in which the drive belt 57 is shifted mostly to side of the secondary pulley 55 at the time of starting to output the reduction gear power of the maximum reduction gear ratio to the secondary shaft 54. The reduced power is changed in the reduction gear ratio through the reduction gear 73, the counter shaft 71 and the counter gear 74 of the speed reduction apparatus 70 in a rear portion of the Continuously variable transmission apparatus 50 and transmitted to the pinion shaft 72. The transmitting direction of the reduced power is changed to the left-and-right (lateral) direction of the vehicle body by the drive pinion 75 and the crown gear 76, and the reduced power is inputted to the front differential 80. The power is distributed to the left and the right in the front differential 80, the distributed power is transmitted to the left and right front wheels 8 through the side gears 84, 85 and the axle 86.

At this time, the reduced power is further inputted to the transfer shaft 92 of the transfer apparatus 90 through the drive gear 74 of the counter shaft 71 and the output gear 91. Then, when a predetermined clutch torque is generated at the transfer clutch 94 at the time of slipping the front wheel 58, the power responsive to the clutch torque is also transmitted to the rear wheels 97 through the rear drive shaft 93, the propeller shaft 95, the rear differential 96, etc., to drive the rear wheels 97. Thus, the motor vehicle 1 is so moved forwardly as not to slip by the four wheel drive system of the FF type.

When the motor vehicle 1 moves forwardly, the operating condition of the motor vehicle 1 is detected by the electronic control system of the continuously variable transmission 50. When the vehicle 1 is accelerated, the primary pressure of the primary cylinder 53 rises, and the drive belt 57 is sequentially shifted to the side of the primary pulley 52 to shift up at the reduction gear ratio, and the continuously variable transmission 50 reaches a high-speed stage of a minimum reduction gear ratio. When the vehicle 1 is decelerated at the time of shifting at the reduction gear ratio, the drive belt 57 is again shifted to the secondary pulley 55 due to a decrease in the primary pressure of the primary cylinder 53 to shift down at the reduction gear ratio. When the motor vehicle 1 is stopped, the continuously variable transmission 50 is returned to a low-speed stage of a maximum reduction gear ratio. Thus, the continuously variable transmission 50 is smoothly shifted at the reduction gear ratio continuously in response to the operating and traveling state of the motor vehicle 1.

When the select lever 12 is set to the R range, the forward/reverse changeover apparatus 40 is set to a reverse position by engaging the reverse brake 47 of the forward/reverse changeover apparatus 40, the direction of the power is reversed, and the power is inputted to the continuously variable transmission 50. The reversed power with the maximum reduction gear ratio is outputted from the continuously variable transmission 50. And then the reversed power is transmitted to the front wheels 8 and the rear wheels 97 similarly to the above-mentioned description, and hence the motor vehicle 1 is moved reversely.

Figure 11A:
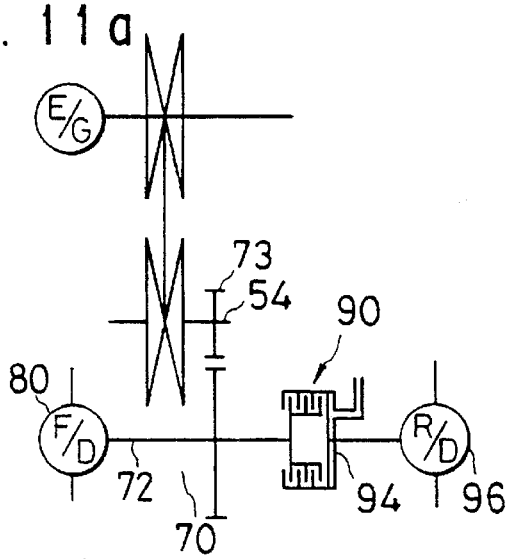
FIGS. 11a to 11e are schematic views showing the other embodiment of the present invention.
Figure 11B:
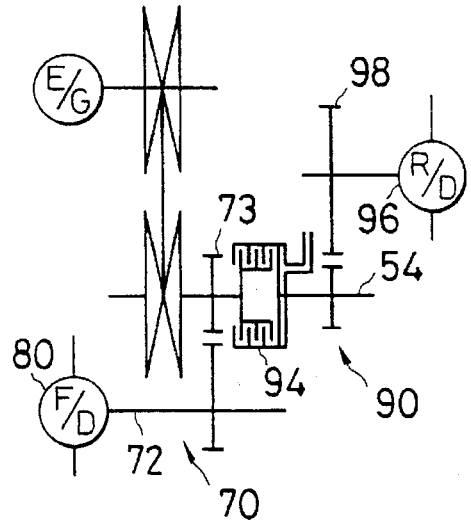
Figure 11C:
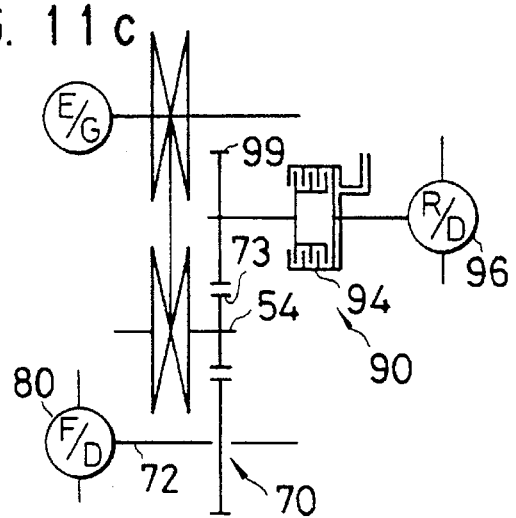

Referring to FIGS. 11a and 11b, the sixth embodiment of the present invention will be described. The sixth embodiment has modified speed reduction apparatus 70 and transfer apparatus 90. In FIG. 11a, a secondary shaft 54 is operatively connected to a pinion shaft 72 through one set of reduction gears 73 of the speed reduction apparatus 70, and the power is transmitted from the pinion shaft 72 to a rear differential 96 side through a transfer clutch 94. In FIG. 11b, the speed reduction apparatus 70 is constructed similarly to FIG. 11a, and the power is transmitted from the secondary shaft 54 to the rear differential 96 through the transfer clutch 94 and one set of reduction gears 98. In FIG. 11c, the speed reduction apparatus 70 is similar to FIG. 11a, and a reduction gear 99 is meshed with the reduction gear 73, and the power is transmitted from the reduction gear 99 to the rear differential 96 through the transfer clutch 94.

Figure 11D:
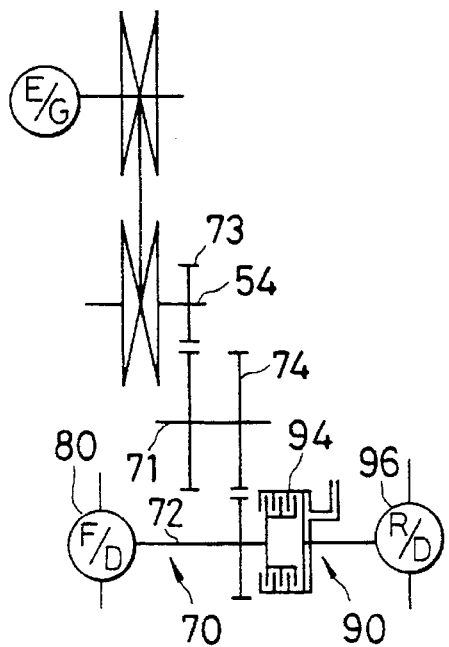
Figure 11E:
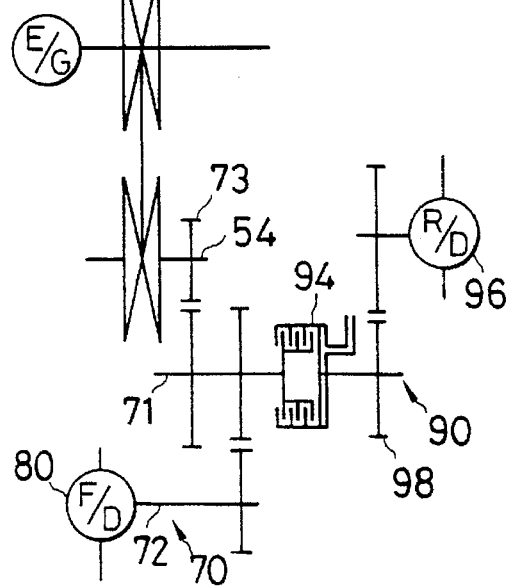
Figure 12:
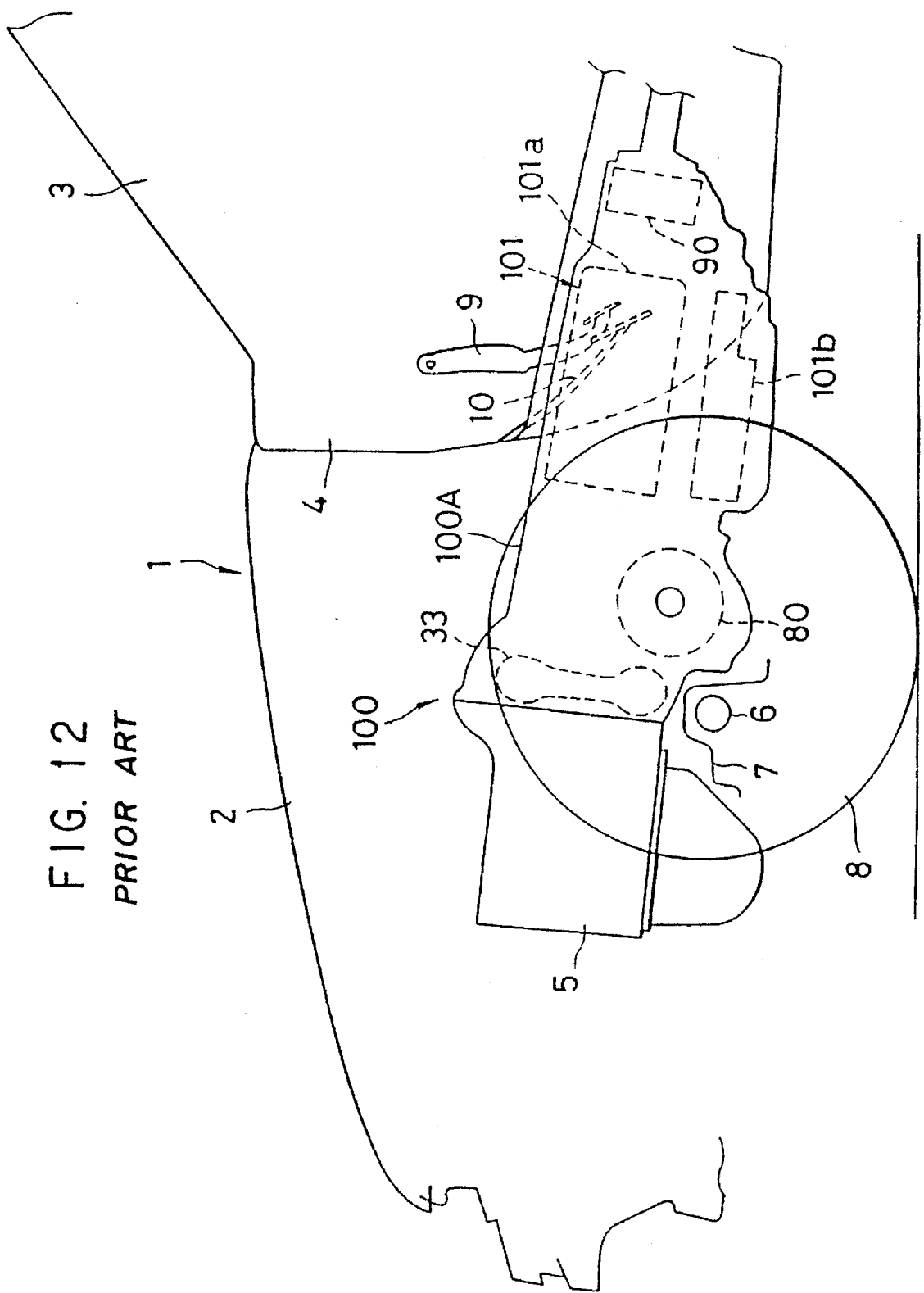
FIG. 12 is a sectional view showing the vehicle with a conventional power unit.

In FIG. 11d, the speed reduction apparatus 70 is similar to the embodiment described above, and the power is transmitted from the pinion shaft 72 to the rear differential 96 through the transfer clutch 94. In FIG. 11e, the power is transmitted from the counter shaft 71 to the rear differential 96 through the transfer clutch 94 and one set of gears 98. In all the modified embodiments, the reduced power of the speed reduction apparatus 70 is transmitted to the front and rear wheels 8 and 97.

According to first embodiment of the present invention as described above, the transmission comprises the clutch operatively connected to the engine for engaging and/or disengaging the power to the wheel; a changeover apparatus directly and coaxially interposed between the starting clutch and the continuously variable transmission for changing a moving direction of the motor vehicle forwardly and rearwardly; a speed reduction apparatus functionally connected to the continuously variable transmission just under an intermediate position between the changeover apparatus and the continuously variable transmission for reducing an output shaft speed of the continuously variable transmission and for changing a transmitting direction of the power; a front differential perpendicularly suspended under the speed reduction apparatus such that an axis of the differential crosses at a right angle of an axis of the speed reduction apparatus and integrally housed in a case with the transmission and the speed reduction apparatus for absorbing a speed difference between left and right wheels so as to be operatively connected in an integral structure, and the longitudinally mounted transmission having the continuously variable transmission can be reduced in size and weight. Therefore, in the case where the engine and the transmission are longitudinally connected each other and arranged in the engine compartment, the transmission can be mounted in parallel with the engine at the front position of the toe board in the engine compartment. Hence a tunnel for allowing the transmission to protrude into the passenger room is eliminated to improve a spacious feeling and to optimize comfortability and an arrangement of equipments such as various pedals in the motor vehicle.

Since the front differential is suspended just under the middle point between the forward/reverse changeover apparatus and the continuously variable transmission such that the differential axis crosses at the right angle of the speed reduction apparatus, the steering gear box and the cross member are mounted similarly to the prior art, and the front differential can be operatively connected to the front wheels without fail, and hence the vehicle body structure can be largely modified for various design configurations.

Since the transmission has the short axial length and the shape protruded at the left and right and lower sides, the space of the toe board can be effectively utilized, and the rigidity of the transmission itself is increased. Since the entire length of the engine and the transmission is shortened, an increase in an intrinsic vibration frequency, a whirling motion of the transmission are reduced to improve a vibration, noise.

Since the counter shaft and the pinion shaft are mounted in parallel with the secondary shaft in the speed reduction apparatus, the power can be optimally reduced at the reduction gear ratio and changed in the transmitting direction. And also this is because the power is transmitted through the drive pinion and the crown gear of the reduction gear, the counter gear and the pinion shaft. Further, the rigid and compact structure can be designed with large number of degrees of freedom.

According to the fifth and sixth embodiments of the present invention as described above, the continuously variable transmission comprises the clutch operatively connected to the engine for engaging and/or disengaging the power to the wheel, the changeover apparatus directly and coaxially interposed between the starting clutch and the continuously variable transmission for changing a moving direction of the motor vehicle forwardly and rearwardly, the speed reduction apparatus functionally connected to the continuously variable transmission just under an intermediate position between the changeover apparatus and the continuously variable transmission for reducing an output shaft speed of the continuously variable transmission and for changing a transmitting direction of the power, the front differential perpendicularly suspended under the speed reduction apparatus such that an axis of the differential crosses at a right angle of an axis of the speed reduction apparatus and integrally housed in a case with the transmission and the speed reduction apparatus for absorbing a speed difference between left and right wheels, and the transfer apparatus are mounted in front-and-rear, left-and-right and up-and-down directions to be operatively connected in an integral structure, the power unit of the four wheel drive type having the engine longitudinally mounted via the continuously variable transmission having the continuously variable transmission can be reduced in size and weight. Therefore, in the case where the power unit having the engine is longitudinally connected and arranged in the engine compartment, most of the power unit can be mounted in parallel with the engine at the front position of the toe board in the engine compartment. Hence the installation of the power unit upon the passenger room is eliminated to improve spacious feeling and to optimize comfortability and an arrangement of equipments such as various pedals in the motor vehicle.

Since the front differential is suspended just under the middle point between the forward/reverse changeover apparatus and the continuously variable transmission such that the differential axis crosses at the right angle of the speed reduction apparatus, the steering gear box and the cross member of the vehicle body structural member are mounted similarly to the prior art, and the front differential can be operatively connected to the front wheels without fail, and hence the vehicle body structure can be largely modified.

Since the power unit has the short axial length and the shape protruded at the left and right and lower sides, the space of the toe board can be effectively utilized, and the rigidity of the power unit itself is increased. Since the entire length of the power unit is shortened, an increase in an intrinsic vibration frequency, a whirling motion of the power unit are reduced to improve a vibration, noise.

Since the speed reduction apparatus is mounted in a rear portion of the continuously variable transmission and the transfer apparatus is operatively connected to the speed reduction apparatus, a rigid and compact structure is provided to be adapted for four wheel drive system of the FF type, and interchangeability between the FF type motor vehicle and the four wheel drive motor vehicle is excellent. The positions, the reduction gear ratio of the front differential and the transfer shaft, the change of the power transmitting direction, the power distribution to the front or rear wheel can be set to optimum.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A motor vehicle comprising:

a continuously variable transmission;

an engine longitudinally mounted on a front side of said motor vehicle for outputting power to drive a wheel via said continuously variable transmission;

a passenger compartment including foot operational equipment;

an engine compartment on said front side of said motor vehicle;

a toe board partitioning said passenger compartment and said engine compartment;

a starting clutch operatively connected to said engine for engaging and disengaging said power to said wheel;

a changeover apparatus, directly and coaxially interposed between said starting clutch and said continuously variable transmission, for changing a moving direction of said motor vehicle forwardly or rearwardly;

a speed reduction apparatus functionally connected to said continuously variable transmission just under an intermediate position between said changeover apparatus and said continuously variable transmission, for reducing an output shaft speed of said continuously variable transmission and for changing a transmitting direction of said power; and a front differential, perpendicularly suspended under said speed reduction apparatus such that an axis of said front differential crosses at a right angle to an axis of said speed reduction apparatus and integrally housed in a case with said continuously variable transmission and said speed reduction apparatus, for absorbing a speed difference between left and right wheels, wherein said continuously variable transmission is mounted in parallel with said engine in front of said toe board in said engine compartment so as to efficiently minimize a size and weight of said motor vehicle and to largely optimize comfortability and an arrangement of said equipment in said motor vehicle.

2. The motor vehicle according claim 1, further comprising:

Wherein a torque converter is a part of Said starting clutch and is coaxially interposed between said engine and said changeover apparatus and integrally housed in a front portion of said case, for converting a torque of said outputting power to said wheel;

a primary pulley shaft of said transmission operatively connected to said changeover apparatus; and a secondary pulley being parallel with said primary pulley shaft and driven by a belt, wherein said front differential is suspended just under a middle point between said speed reduction apparatus and said continuously variable transmission; and said speed reduction apparatus is directly connected to and integrally housed with said front differential, reduces a speed of a secondary shaft end of said secondary pulley and changes said transmitting direction of said power.

3. The motor vehicle according to claim 1, further comprising a counter shaft operatively connected to said secondary shaft end;

a pinion shaft provided in parallel with said secondary shaft and said counter shaft;

a desired reduction gear ratio obtained by a combination of said secondary shaft, said counter shaft and said pinion shaft;

a drive pinion formed on one end of said pinion shaft; and a crown gear meshed with said drive pinion for changing said transmitting direction of said power.

4. The motor vehicle according to claim 1, further comprising:

a steering gear box and a cross member being arranged under said starting clutch of said transmission wherein said engine and said continuously variable transmission are longitudinally connected and arranged in said engine compartment; and said outputting power is transmitted to said wheel through said front differential under said continuously variable transmission.

* * * * *